3,341,993
ANCHOR
Robert A. Lavond, 1395 San Tomas Aquino Road, San Jose, Calif. 95130; and Lado Muhlstein, Jr., 280 Easy St., Apt. 14B; and Donald L. Kassner, 2480 Wyandotte, Apt. 4, both of Mountain View, Calif. 94040
Filed May 17, 1965, Ser. No. 456,331
1 Claim. (Cl. 52—158)

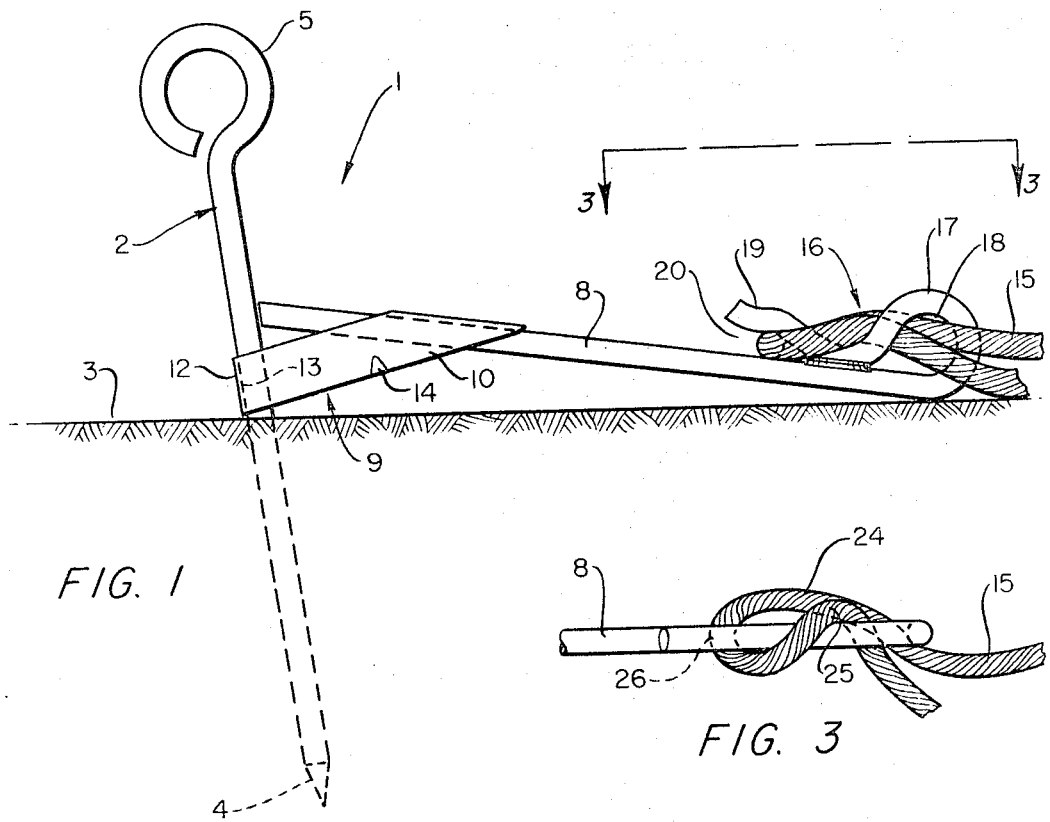
FIG. 1
FIG. 3
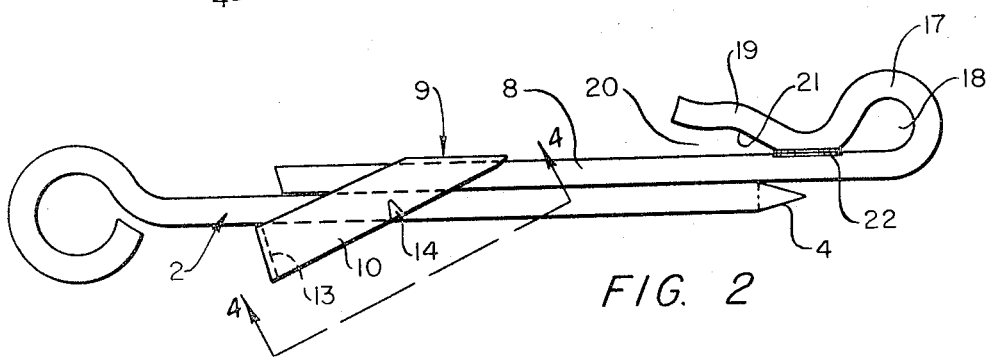
FIG. 2
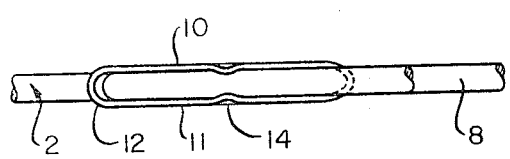
FIG. 4
INVENTORS
ROBERT A. LAVOND
LADO MUHLSTEIN JR.
BY DONALD L. KASSNER
Leon F. Herbert
ATTORNEY

United States Patent Office 3,341,993
Patented Sept. 19, 1967

ABSTRACT OF THE DISCLOSURE

A land anchor suitable for securing a boat comprises a stake for insertion into the ground. One end of the stake has a sharp projection to penetrate the ground, while the opposite end thereof has an eye to render it suitable as a surface to be hammered and also to render it suitable for manual gripping to remove it from the ground.

A connecting arm is coupled to the stake by a coupling bracket. The coupling bracket is fixedly secured to the connecting arm and is formed with an opening to receive the stake for movement relative thereto. In the operating position, a wall of the coupling bracket engages the stake in a holding relation. In the storage position, the stake can be moved in juxtaposition with the connecting arm.

A rope is attached to the free end of the connecting arm. For this purpose, the free end of the connecting arm is formed with an eye and a hook. A wedging surface is formed by the confronting walls of the hook and the connecting arm to provide a wedging action to secure a rope that is received by the eye and is disposed between the confronting wall of the hook and the connecting arm.

---

This invention relates to means for holding objects in place against a removal force. The invention is particularly concerned with the problem of providing a suitable shore anchor for use with boats.

In the field of modern pleasure boating, much of the activity takes place on lakes, rivers, and quiet bays where it is often desirable to tie a boat along a shoreline. For example, it is often enjoyable to tie one's boat along the shore to have a picnic out on the ground, or swim from a beach, or camp overnight. For these and numerous other purposes, it is necessary to have a convenient and safe means for securing the boat to the shore.

Accordingly, an object of the present invention is to provide a shore anchor which can be quickly set in place and yet will have good holding power.

Since the normal use of a shore anchor is not permanently in any one spot, it is also an object of the invention to provide a shore anchor which is removable.

Another object of the invention is to provide a shore anchor which can be collapsed into a compact unit for convenient storage and transportation.

Since changing tides and winds tend to shift the position of an anchored boat, a further object of the invention is to provide a shore anchor which will accommodate change in the direction of pull.

An additional object of the invention is to provide an improved cleat design to which a rope can be quickly attached and released and yet provide a strong reliable connection. More specifically, an object of the invention is to provide a cleat to which a rope can be attached without tying a knot in the rope.

These and other objects and features of advantage of the invention will become more apparent from the following detailed description wherein the reference is made to the accompanying drawings in which:

FIGURE 1 is a side elevational view of a shore anchor arranged in operating position and inserted into the ground;

FIGURE 2 is a side elevational view showing the shore anchor removed from the ground and adjusted into its collapsed position for convenient storage or transportation;

FIGURE 3 is a top view of the cleat portion of the anchor to complete the showing of how the cleat cooperates to hold a rope; and FIGURE 4 is a view of a part of FIG. 2 taken on the line 4—4.

Referring in more detail to the drawings, the land anchor 1 comprises a stake 2 for insertion into the ground which is indicated at 3. The stake 2 is provided with a point 4 at one end and a hook or eye shape 5 at the other end. The stake may be made of metal rod stock which is sharpened at one end to provide the point 4 and bent at the other end to provide the eye-shape 5. Other shapes could be substituted for the eye-shape 5 as long as the same purposes are served. More specifically the purposes are to provide a hammering surface whereby the stake can be driven into the ground and to provide a shape which can be gripped for pulling the stake out of the ground.

In addition to the stake 2 the land anchor comprises a connecting arm 8. As shown in the drawings the left end of the connecting arm 8 is coupled to the stake 2 by a bracket or coupling extension 9. The bracket 9 has a generally U-shaped construction forming two leg portions 10 and 11 and a bight portion 12. Bracket 9 is preferably made from strip metal stock, bent into the shape shown in the drawings, and then the ends of legs 10 and 11 are bent over the upper surface of arm 8 and welded thereto. The bracket could of course also be made as a one-piece unit, and in any event it is rigidly attached to the arm 8 as by welding. As shown in the drawings the inside of the bight portion 12 forms a holding surface 13 which slidingly engages the stake 2 when the anchor is assembled in operating position.

It will now be apparent that the coupling bracket 9 is shaped to form an open space through which the stake 2 can be moved between engagement with the holding surface 13 as shown in FIG. 1 and a storage position adjacent the connecting arm 8 as shown in FIG. 2. In order to hold the stake 2 in its storage position each of the bracket arms 10 and 11 is provided with a detent 14 past which the stake can be snapped into and out of storage position. It will be noted that the parts are so arranged that when the stake 2 is in its operating position in engagement with the holding surface 13 it is also in abutment with the left end of the connecting rod 8. This arrangement holds the stake 2 at the proper angle in the ground, as will be hereinafter discussed in detail. The arrangement does not require permanent connection between the stake and the connecting arm, and in fact the arrangement is such that the stake 2 can be freely driven through the U-shaped bracket 9 and into the ground. In addition to being able to move stake 2 relative to arm 8 for driving the stake into the ground, it will also be apparent that the arm 8 is free to pivot about the stake 2 and thus can accommodate some change in the direction of pull.

As shown in the drawings, means are provided at the right end of the connecting arm 8 to which a rope 15 can be attached. The connecting means is in the form of a special cleat design 16. The connecting arm 8 is preferably made of a length of metal rod stock with the end rebent to form an eye portion 17 having an eye opening 18 and a hook portion 19 forming a hook opening 20. The rod 8 is preferably shaped to be straight adjacent the inner end of the hook opening 20 to provide a good wedging surface 21 as shown best in FIG. 2. The portion of rod 8 is intermediate the eye opening 18 and the hook opening 20 is welded to the adjacent length of rod 8 at the location 22.

The way in which the hook and eye type cleat arrangement is used to secure the end of a rope 15 will be apparent from FIGS. 1 and 3. Thus, the end of a rope to be secured is fed through the eye 18, through the hook opening 20 and then back through the eye 18. When a pull is exerted along the rope 15 the connection between the rope and the cleat merely becomes tighter because the rope area 26 is tightly gripped by the wedging action of surface 21. The rope 15 can be immediately released simply by removing the tension force and then pulling the free end back through the eye opening 18 and out of the hook opening 20.

It should be noted that when the shore anchor is properly inserted into the ground as shown in FIG. 1 a pull on rope 15 will tend to drag the stake 2 sideways through the ground rather than tilt the stake over and pull it lengthwise out of the ground. Obviously the holding power of the anchor would be reduced if the stake were free to tilt over until its axis approached being aligned with the direction of pull. The means for preventing the stake from being tilted over by the pull on rope 15 comprises the arrangement of the holding surface 13 and the left end of arm 8. The left end of arm 8 forms an abutment surface which engages stake 2 at a position spaced along the stake from the holding surface 13. Thus, the holding surface 13 and the abutment surface at the left end of arm 8 impart a bending moment to stake 2 which tends to give a counterclockwise tilt to the stake and thus prevents the stake from tilting clockwise. It should be noted that when the left end of arm 8 abuts shaft 2, the shaft and the arm form an acute angle so that a pull along the arm 8 will cause the shaft to tend to dig itself further into the ground.

Although specific details of the present invention are shown and described herein, it is to be understood that modifications may be made therein without departing from the spirit and scope of the invention as set forth in the appended claim. Thus, although the apparatus has been particularly described for use in anchoring boats to land it obviously has features which make it extremely useful for other anchoring purposes. For example, the apparatus could be used to anchor airplanes to the ground, or it might be used to anchor a hanging device to the wall of a building or other vertical surface such as a tree trunk.

Having thus described the invention, what is claimed as new and desired to be secured by Letters Patent is:

An anchor comprising a stake, a connecting arm, a coupling extension on said arm coupling the arm to said stake, said coupling extension having wall means forming a holding surface for slidingly engaging said stake, said coupling extension being shaped to form an open space through which said stake can be moved between engagement with said holding surface and parallel alignment with said connecting arm, said connecting arm being rebent to form an eye opening at a position spaced from said coupling extension, and said connecting arm being shaped to form a hook adjacent said eye opening, said hook being disposed intermediate the ends of said arm and being formed as a continuation of the rebent portion of the arm, said hook having its open end toward said coupling extension and its closed end toward said eye opening, said hook being formed with a wall confronting said connecting arm in an angularly disposed arrangement to form a wedging action therebetween for gripping a rope disposed therebetween and received by the eye opening.

References Cited

UNITED STATES PATENTS

| | | | |
|---|---|---|---|
| 781,221 | 1/1905 | Morris | 52—156 |
| 1,230,711 | 6/1917 | Hjermstad | 52—157 |
| 2,522,672 | 9/1950 | Graham | 287—64 |

FRANK L. ABBOTT, *Primary Examiner.*

G. W. HORNADAY, R. S. VERMUT,
*Assistant Examiners.*